(12) United States Patent
Okumoto

(10) Patent No.: US 11,605,821 B2
(45) Date of Patent: Mar. 14, 2023

(54) SOLID OXIDE TYPE FUEL BATTERY CELL

(71) Applicant: KYOCERA Corporation, Kyoto (JP)

(72) Inventor: Kentaro Okumoto, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 240 days.

(21) Appl. No.: 17/049,413

(22) PCT Filed: Apr. 8, 2019

(86) PCT No.: PCT/JP2019/015310
§ 371 (c)(1),
(2) Date: Oct. 21, 2020

(87) PCT Pub. No.: WO2019/208187
PCT Pub. Date: Oct. 31, 2019

(65) Prior Publication Data
US 2021/0257631 A1    Aug. 19, 2021

(30) Foreign Application Priority Data

Apr. 26, 2018   (JP) .............................. JP2018-085377

(51) Int. Cl.
*H01M 8/0247*   (2016.01)
*H01M 8/0258*   (2016.01)
*H01M 8/12*     (2016.01)

(52) U.S. Cl.
CPC ....... *H01M 8/0247* (2013.01); *H01M 8/0258* (2013.01); *H01M 8/12* (2013.01)

(58) Field of Classification Search
None
See application file for complete search history.

(56) References Cited

U.S. PATENT DOCUMENTS

2006/0153974 A1   7/2006   Matsuzaki et al.
2012/0107715 A1   5/2012   Ohmori et al.

FOREIGN PATENT DOCUMENTS

| EP | 0516417 A1 | 12/1992 |
|---|---|---|
| EP | 2595230 A1 | 5/2013 |
| JP | 2012-038718 A | 2/2012 |
| JP | 6298908 B1 | 3/2018 |
| JP | 2018-98201 A | 6/2018 |

*Primary Examiner* — Haroon S. Sheikh
(74) *Attorney, Agent, or Firm* — Procopio Cory Hargreaves and Savitch LLP

(57) ABSTRACT

A cell includes a support substrate, electricity generation element parts that are arrayed at locations on a principal face of the support substrate and include a fuel electrode, a solid electrolyte, and an air electrode, and electrical connection parts that are each provided between adjacent electricity generation element parts and electrically connect a fuel electrode of one of the electricity generation element parts and an air electrode of another of the electricity generation element parts, wherein an electrical connection part bridges over the adjacent electricity generation element parts and includes air electrode collector parts, and the air electrode collector parts include a first site on an electricity generation element part on a side of a first end, a second site on the electricity generation element part other than the third end part, and a third site on a side of a second end.

9 Claims, 4 Drawing Sheets

SOLID OXIDE TYPE FUEL BATTERY CELL

CROSS-REFERENCE TO RELATED APPLICATION(S)

This application is a national stage application of International Application No. PCT/JP2019/015310 filed on Apr. 8, 2019, which designates the United States, the entire contents of which are herein incorporated by reference, and which is based upon and claims the benefit of priority to Japanese Patent Application No. 2018-085377 filed on Apr. 26, 2018, the entire contents of which are herein incorporated by reference.

FIELD

The present disclosure relates to a solid oxide type fuel battery cell.

BACKGROUND

A solid oxide type fuel battery cell (that may be referred to as a cell, below) has conventionally been known that includes "a porous support substrate that is provided with a gas flow channel in an inside thereof and does not have an electron conductivity", "a plurality of electricity generation element parts that are respectively provided at a plurality of locations that are separated from one another on a surface of the support substrate and are provided by laminating a fuel electrode, a solid electrolyte, and an air electrode", and "one or more electrical connection parts that are each provided between one set or multiple sets of adjacent electricity generation element parts and electrically connect a fuel electrode of one of the adjacent electricity generation element parts and an air electrode of another thereof" (see, for example, Patent Literature 1). Such a configuration is also referred to as "a horizontal stripe type". A fuel gas is introduced from an end of a gas flow channel inside such a cell and a gas that includes oxygen flows from an end thereof outside such a cell, so that it is possible to execute electricity generation.

CITATION LIST

Patent Literature

Patent Literature 1: Japanese Patent Application Publication No. 2012-038718

SUMMARY

A cell in the present disclosure is a cell that is of a columnar shape where a gas flows through each of an inside and an outside thereof from a first end to a second end on an opposite side of the first end in a longitudinal direction thereof, including a support substrate that has a gas flow channel in an inside thereof and is of an insulating property, of a columnar shape, of a flat plate shape, and porous, a plurality of electricity generation element parts that are respectively arrayed along the longitudinal direction at a plurality of locations that are separated from one another on at least one principal face of the support substrate and are parts where at least a fuel electrode, a solid electrolyte, and an air electrode are laminated, and a plurality of electrical connection parts that are each provided between adjacent electricity generation element parts and electrically connect a fuel electrode of one of the electricity generation element parts and an air electrode of another of the electricity generation element parts, wherein an electrical connection part bridges over the adjacent electricity generation element parts and has a plurality of air electrode collector parts where at least a part thereof is laminated on an air electrode, and in a case where the plurality of air electrode collector parts are classified into a first site that is an area that is laminated on an electricity generation element part and is a third end part on a side of the first end, a second site that is an area that is laminated on the electricity generation element part and is other than the third end part, and a third site that is a fourth end part on a side of the second end, they have sites in such a manner that a shape or a property of one site is different from a shape or a property of another site.

DESCRIPTION OF EMBODIMENTS

Figure 1A:
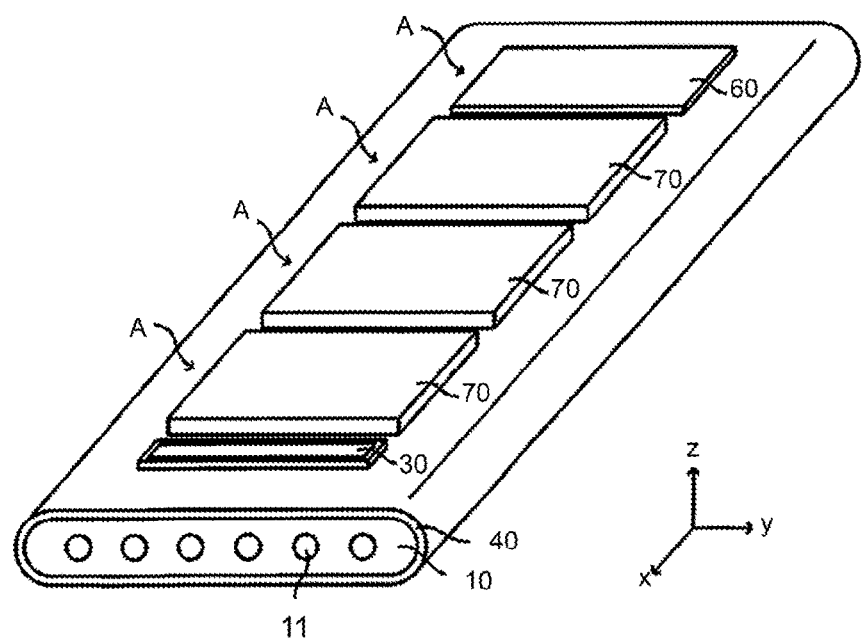
FIG. 1A is a perspective view that illustrates a solid oxide type fuel battery cell in the present embodiment.

FIG. 1A illustrates a solid oxide type fuel battery cell in the present embodiment. In a cell, a plurality of (four, in the present embodiment) electricity generation element parts A with identical shapes that are electrically connected in series are arrayed at a predetermined interval in a longitudinal direction thereof on each of upper and lower faces (mutually parallel principal faces (flat faces) on both sides) of a support substrate 10 with a columnar shape and a flat plate shape that has a longitudinal direction thereof (a direction of an x-axis). Such a cell is a so-called "horizontal stripe type".

A shape of such a cell that is viewed from above is, for example, a rectangular shape where a length of a side thereof in a longitudinal direction thereof is 5 to 50 cm and a length thereof in a width direction thereof (a direction of a y-axis) that is orthogonal to the longitudinal direction is 1 to 10 cm. A thickness of such a cell is 1 to 5 mm. Such a cell is of a vertically symmetric shape with respect to a plane that passes through a center thereof in a thickness direction thereof and is parallel to a principal face of the support substrate 10. Hereinafter, a detail of such a cell will be explained with reference to FIG. 2 that is a cross-sectional view of such a cell in a longitudinal direction of a cell as illustrated in FIG. 1A, in addition to FIG. 1A.

Figure 2:
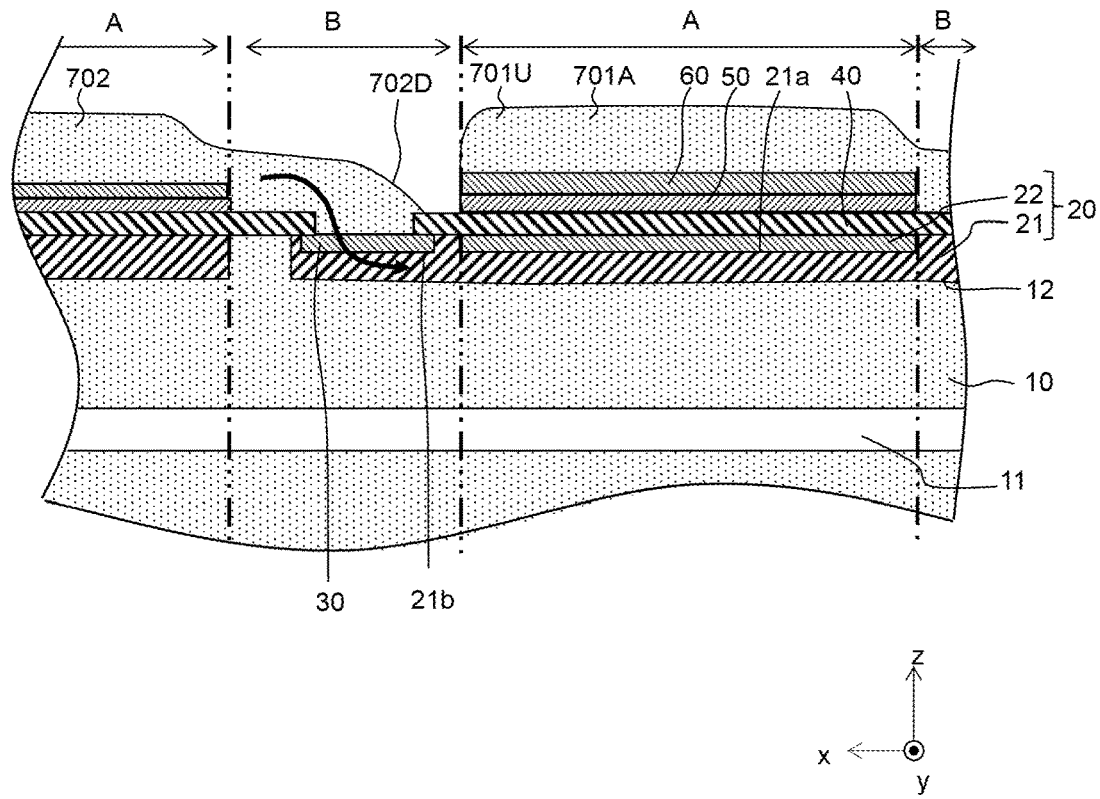
FIG. 2 is a cross-sectional view of a solid oxide type fuel battery cell as illustrated in FIG. 1A.

FIG. 2 is a part of a cross-sectional view of a solid oxide type fuel battery cell as illustrated in FIG. 1A in a longitudinal direction thereof. In other words, it is a part of a cross-sectional view that includes a gas flow channel 11, an electricity generation element part(s) A, and an electrical connection part(s) B.

The support substrate 10 is a fired body with a columnar shape and a flat plate shape that is composed of a (insulating) porous material that does not have an electron conductivity. Inside the support substrate 10, a plurality of (six, in the present embodiment) gas flow channels 11 (through-holes)

that extend in a longitudinal direction thereof are located at a predetermined interval in a width direction thereof.

In the present embodiment, a first recess 12 is provided at each of a plurality of locations on a principal face of the support substrate 10. Each first recess 12 is a recessed portion with a rectangular solid shape that is defined by a bottom wall that is composed of a material of the support substrate 10 and side walls that are composed of the material of the support substrate 10 over a whole circumference thereof and are closed in a circumferential direction thereof (two side walls along a longitudinal direction thereof and two side wall along a width direction thereof).

The support substrate 10 includes "a transition metal oxide or a transition metal" and an insulating ceramic(s). "A transition metal oxide or a transition metal" may be NiO (nickel oxide) or Ni (nickel). It is possible for a transition metal to function as a catalyst that accelerates a reforming reaction of a fuel gas (a reforming catalyst for a hydrocarbon-type gas).

An insulating ceramic(s) may be MgO (magnesium oxide) or "a mixture of $MgAl_2O_4$ (magnesia alumina spinel) and MgO (magnesium oxide)". Furthermore, for an insulating ceramic(s), CSZ (calcia-stabilized zirconia), YSZ (8YSZ) (yttria-stabilized zirconia), or $Y_2O_3$ (yttria) may be used.

The support substrate 10 includes "a transition metal oxide or a transition metal", so that it is possible for a gas that includes a residual gas component before reforming to accelerate reforming of the residual gas component before reforming by a catalytic action as described above. In addition, the support substrate 10 includes an insulating ceramic(s), so that it is possible to ensure an insulating property of the support substrate 10. As a result, it is possible to ensure an insulating property between adjacent fuel electrodes.

A thickness of the support substrate 10 is 1 to 5 mm. Hereinafter, only a configuration of the support substrate 10 on an upper face side thereof will be explained for explanatory convenience by taking a shape of such a structural body that is vertically symmetric into consideration. The same also applies to configuration of the support substrate 10 on a lower face side thereof.

Figure 1B:
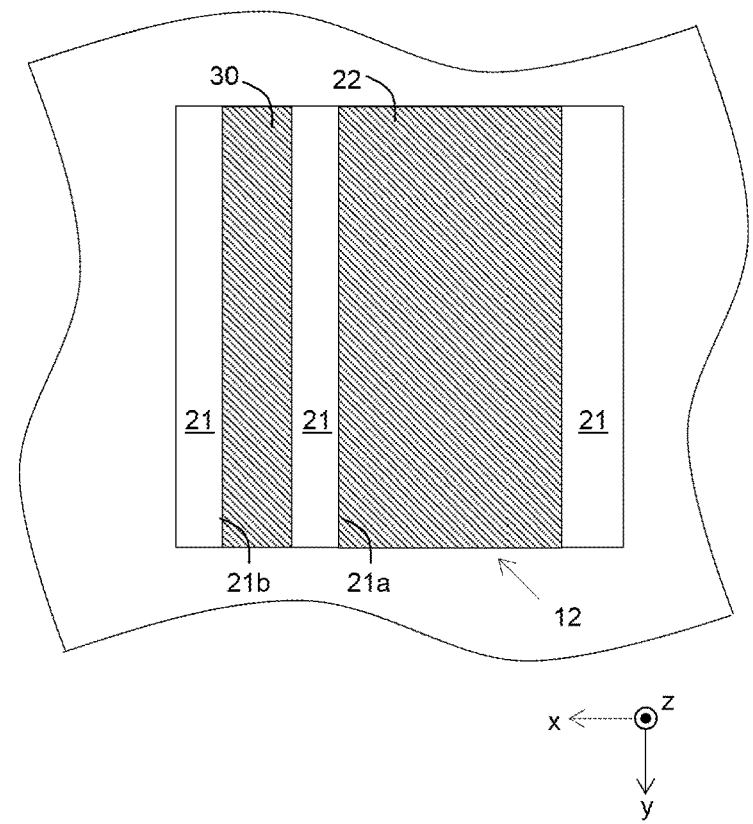
FIG. 1B is a plan view that illustrates a state where a fuel electrode and an interconnector are buried in a recess.

As illustrated in FIG. 2, a whole of a fuel electrode collector part 21 is buried in (fills) each first recess 12 that is located on an upper face of the support substrate 10 (a principal face thereof on an upper side thereof). Therefore, each fuel electrode collector part 21 is of a rectangular solid shape. A second recess 21a is provided on an upper face (an outer face) of each fuel electrode collector part 21. As illustrated in FIG. 1B, each second recess 21a is a recessed portion with a rectangular solid shape that is defined by a bottom wall that is composed of a material of the fuel electrode collector part 21 and side walls that are closed in a circumferential direction thereof (two side walls along a longitudinal direction thereof and two side walls along a width direction thereof). Among side walls that are closed in a circumferential direction thereof, two side walls along a longitudinal direction thereof (a direction of an x-axis) are a part of the support substrate 10 and two side walls along a width direction thereof (a direction of a y-axis) are a part of the fuel electrode collector part 21.

A fuel electrode active part 22 is buried in (fills) each second recess 21a. Each fuel electrode active part 22 is of a rectangular solid shape. A fuel electrode 20 includes the fuel electrode collector part 21 and the fuel electrode active part 22. The fuel electrode 20 (the fuel electrode collector part 21 and the fuel electrode active part 22) is a porous fired body that has an electron conductivity. Two side faces and a bottom face of each fuel electrode active part 22 along a width direction thereof (a direction of a y-axis) contact the fuel electrode collector part 21 in the second recess 21a.

A third recess 21b is provided on a part that excludes the second recess 21a on an upper face (an outer face) of each fuel electrode collector part 21. Each third recess 21b is a recessed portion with a rectangular solid shape that is defined by a bottom wall that is the fuel electrode collector part 21 and side walls that are closed in a circumferential direction thereof (two side walls along a longitudinal direction thereof and two side walls along a width direction thereof). Among side walls that are closed in a circumferential direction thereof, two side walls along a longitudinal direction thereof (a direction of an x-axis) are a part of the support substrate 10 and two side walls along a width direction thereof (a direction of a y-axis) are a part of the fuel electrode collector part 21.

An interconnector (a conductive compact body) 30 is buried in (fills) each third recess 21b. Each interconnector 30 is of a rectangular solid shape. The interconnector 30 is a compact fired body that has an electron conductivity. Two side faces and a bottom face of each interconnector 30 along a width direction thereof contact the fuel electrode collector part 21 in the third recess 21b.

One flat face (a flat face that is identical to a principal face of the support substrate 10 in a case where the recess 12 is not formed) is composed of an upper face (an outer face) of the fuel electrode 20 (the fuel electrode collector part 21 and the fuel electrode active part 22), an upper face (an outer face) of the interconnector 30, and a principal face of the support substrate 10.

The fuel electrode active part 22 may include, for example, NiO (nickel oxide) and YSZ (yttria-stabilized zirconia). Alternatively, it may include NiO (nickel oxide) and GDC (gadolinium-doped ceria). The fuel electrode collector part 21 may include, for example, NiO (nickel oxide) and YSZ (yttria-stabilized zirconia). Alternatively, it may be composed of NiO (nickel oxide) and $Y_2O_3$ (yttria) or may include NiO (nickel oxide) and CSZ (calcia-stabilized zirconia). A thickness of the fuel electrode active part 22 is 5 to 30 μm. A thickness of the fuel electrode collector part 21 (that is, a depth of the first recess 12) is 50 to 500 μm.

The fuel electrode collector part 21 is of an electron conductivity. The fuel electrode active part 22 has an electron conductivity and an oxidizing ion (an oxygen ion) conductivity. "A ratio of a volume of a material that has an oxidizing ion conductivity to a total volume that excludes a pore part" in the fuel electrode active part 22 is greater than "a ratio of a volume of a material that has an oxidizing ion conductivity to a total volume that excludes a pore part" in the fuel electrode collector part 21.

The interconnector 30 may include, for example, $LaCrO_3$ (lanthanum chromite). Alternatively, it may include (Sr,La)$TiO_3$ (lanthanum-doped strontium titanate). A thickness of the interconnector 30 is 10 to 100 μm. A porosity thereof is 10% or less.

On an outer peripheral face of the support substrate 10 that extends in a longitudinal direction thereof (an array direction of electricity generation element parts A), a whole face of a plurality of interconnectors 30 that excludes a central part thereof is covered by a solid electrolyte film 40. The solid electrolyte film 40 is a compact fired body that has an ion conductivity and does not have an electron conductivity. The solid electrolyte film 40 may include, for example, YSZ (yttria-stabilized zirconia). Alternatively, it may include LSGM (lanthanum gallate type). A thickness of the solid electrolyte film 40 is 3 to 50 μm.

A whole face of an outer peripheral face of the support substrate 10 that extends in a longitudinal direction thereof is covered by a compact layer that is composed of the interconnector 30 and the solid electrolyte film 40. Such a compact layer exerts a gas seal function to prevent or reduce mixing of a fuel gas that flows through an inner space of the compact layer and air that flows through an outer space of the compact layer.

As illustrated in FIG. 2, in the present embodiment, the solid electrolyte film 40 covers an upper face of the fuel electrode 20 (the fuel electrode collector part 21+the fuel electrode active part 22), both end parts of an upper face of the interconnector 30 in a longitudinal direction thereof, and a principal face of the support substrate 10.

An air electrode 60 is located, through a reaction prevention film 50, on an upper face of the solid electrolyte film 40 at a location where it contacts each fuel electrode active part 22. The reaction prevention film 50 is a compact fired body. The air electrode 60 is a porous fired body that has an electron conductivity. Shapes of the reaction prevention film 50 and the air electrode 60 that are viewed from above are rectangular shapes that are substantially identical to that of the fuel electrode active part 22.

The reaction prevention film 50 may include, for example, GDC=$(Ce,Gd)O_2$ (gadolinium-doped ceria). A thickness of the reaction prevention film 50 is 3 to 50 μm. The air electrode 60 may include, for example, LSCF=$(La,Sr)(Co,Fe)O_3$ (lanthanum strontium cobalt ferrite). Alternatively, it may include LSF=$(La,Sr)FeO_3$ (lanthanum strontium ferrite), LNF=$La(Ni,Fe)O_3$ (lanthanum nickel ferrite), LSC=$(La,Sr)CoO_3$ (lanthanum strontium cobaltite), or the like. The air electrode 60 may be two layers that are a first layer (an inner layer) that is composed of LSCF and a second layer (an outer layer) that is composed of LSC. A thickness of the air electrode 60 is 10 to 100 μm.

A reason why the reaction prevention film 50 is interposed therebetween is to prevent or reduce occurrence of an phenomenon that YSZ in the solid electrolyte film 40 and Sr in the air electrode 60 react at a time of cell fabrication or in a cell during an operation thereof to form a reaction layer with a high electrical resistance at an interface between the solid electrolyte film 40 and the air electrode 60.

A laminated body that is provided by laminating the fuel electrode 20, the solid electrolyte film 40, and the air electrode 60 corresponds to "an electricity generation element part A" (see FIG. 2). An electricity generation element part A may include the reaction prevention film 50. A plurality of (four, in the present embodiment) electricity generation element parts A are arranged on an upper face of the support substrate 10 at a predetermined interval in a longitudinal direction thereof.

For adjacent electricity generation element parts A, an air electrode collector part 70 is located on upper faces of the air electrode 60, the solid electrolyte film 40, and the interconnector 30 so as to bridge over the interconnector 30 that is linked to one of the electricity generation element parts A (on a right side in FIG. 2) and the air electrode 60 of another of the electricity generation element parts A (on a left side in FIG. 2). The air electrode collector part 70 is a porous fired body that has an electron conductivity. A shape of the air electrode collector part 70 that is viewed from above is a rectangular shape.

The air electrode collector part 70 includes, for example, LSCF=$(La,Sr)(Co,Fe)O_3$ (lanthanum strontium cobalt ferrite). Alternatively, it may include LSC=$(La,Sr)CoO_3$ (lanthanum strontium cobaltite). Alternatively, it may include Ag (silver) or Ag—Pd (a silver palladium alloy). A thickness of the air electrode collector part 70 is 50 to 500 μm. A porosity thereof is 20 to 60%.

By each air electrode collector part 70, adjacent electricity generation element parts A are electrically connected through "the air electrode collector part 70 and the interconnector 30" that have electron conductivities. A plurality of (four, in the present embodiment) electricity generation element parts A that are arranged on an upper face of the support substrate 10 are electrically connected in series. A part other than "electricity generation element parts A" that includes "the air electrode collector part 70 and the interconnector 30" that have electron conductivities is referred to as "an electrical connection part B".

A side of the gas flow channel 11 of the support substrate 10 may be referred to as "inner" and a side of a surface of the support substrate 10 where an electricity generation element part is arranged may be referred to as "outer".

Figure 3:
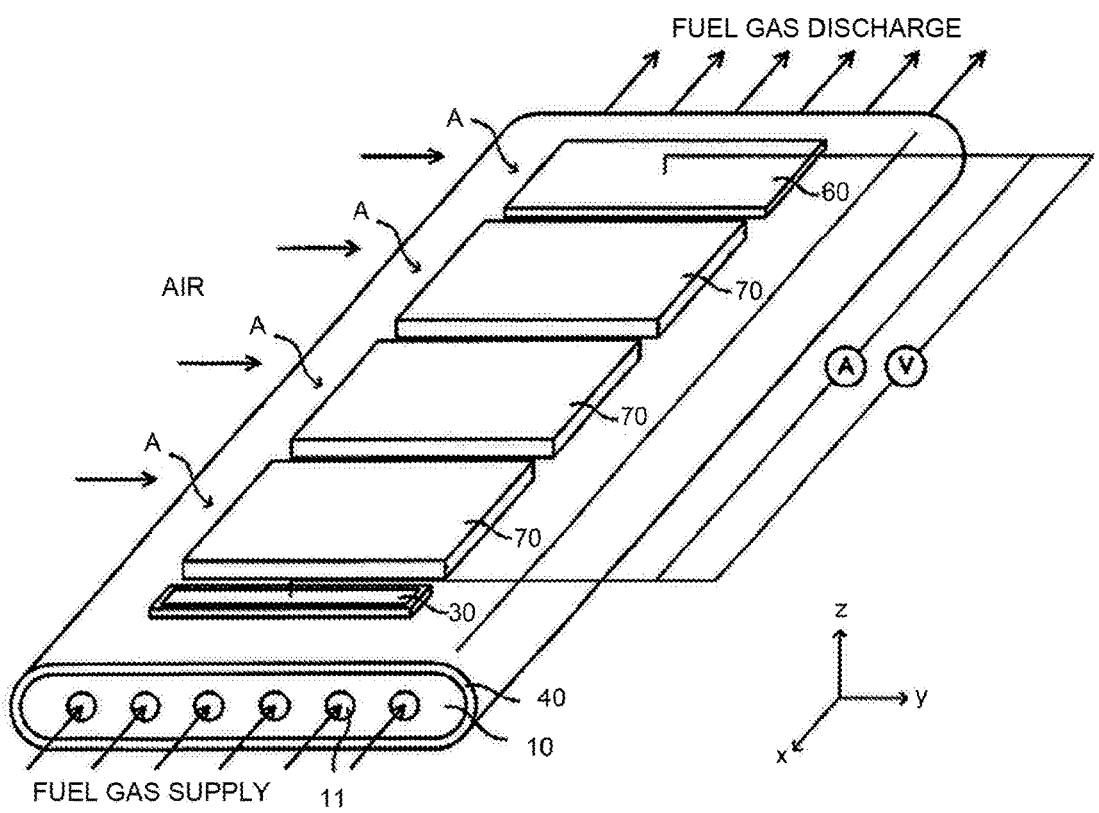
FIG. 3 is a diagram for explaining an operational state of a solid oxide type fuel battery cell as illustrated in FIG. 1A.

As illustrated in FIG. 3, a fuel gas (such as a hydrogen gas) flows in the gas flow channels 11 of the support substrate 10 from a first end that is an end of the support substrate in a longitudinal direction thereof to a second end that is another end thereof, and "a gas that includes oxygen" (such as air) flows along upper and lower faces of the support substrate 10 (in particular, respective air electrode collector parts 70) from the first end to the second end, so that an electromotive force is generated by an oxygen partial pressure difference that is caused between both faces of the solid electrolyte film 40. Moreover, as such a structural body is connected to an external load, chemical reactions as indicated by formulas (1) and (2) as described below occur so that a current flows (an electricity generation state).

(½).$O_2$+2$e^-$→$O^{2-}$ (at: the air electrode 60)    (1)

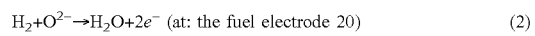

$H_2$+$O^{2-}$→$H_2O$+2$e^-$ (at: the fuel electrode 20)    (2)

Additionally, for a gas that includes oxygen and flows along upper and lower faces of the support substrate 10 from the first end to the second end, it is sufficient that flowing is executed in such a manner that a direction of flowing of such a gas is from the first end to the second end (in a longitudinal direction thereof), and as illustrated in FIG. 3, such a gas may be sprayed in a direction that is orthogonal to a longitudinal direction thereof.

In an electricity generation state, as illustrated in FIG. 2, a current flows between adjacent electricity generation element parts A as indicated by an arrow. As a result, an electric power is taken from a whole cell (specifically, through the interconnector 30 that is linked to an electricity generation element part A on a foremost side and the air electrode 60 of an electricity generation element part A on an innermost side, in FIG. 3). A (non-illustrated) collector member may be provided for electrically connecting a front side and a back side of each cell in series.

Meanwhile, a structure of an air electrode collector part is not controlled conventionally, so that, in a cell where a gas that includes oxygen flows outside from a first end to a second end, the gas that includes oxygen may not efficiently taken from the air electrode collector part into the cell.

Hence, in the present embodiment, in a case where a plurality of air electrode collector parts 70 are classified into a first site that is an area that is laminated on an electricity generation element part A and is a third end part 701U on a side of a first end (an upstream side), a second site that is an area that is laminated on the electricity generation element part A and is other than the third end part 701U (that is indicated by 701A in FIG. 2), and a third site that is a fourth end part 702D on a side of a second end as described above (a downstream side), they have such sites in such a manner that a shape or a property of one site is different from a shape or a property of another site. In a following explanation, an explanation will be provided in such a manner that a first site is represented by the third end part 701U and a third site is represented by the fourth end part 702D, unless otherwise noted.

Thereby, in a cell where a gas that includes oxygen flows outside from a first end to a second end, it is possible to take the gas that includes oxygen from an air electrode collector part into a cell efficiently.

For example, in an embodiment as illustrated in FIG. 2, an outer surface of any one third end part 701U of an air electrode collector part 70 is located in a direction that is distant from the support substrate 10 with respect to an outer surface of a fourth end part 702D of a second air electrode collector part 702 on a side of a second end (a downstream side) that is adjacent to the third end part 701U. In such a case, it is found that a shape of a first site of one air collector part 701 is different from that of a third site of another air collector part 701.

Thereby, a structure is provided in such a manner that, among the third end part 701U and the fourth end part 702D that are opposed through a space in a longitudinal direction, the third end part 701U on a downstream side protrudes outside with respect to the fourth end part 702D on an upstream side. Thereby, a gas that includes oxygen and flows from a first end positively collides with the third end part 701U of a first air electrode collector part 701 that is located on an upstream side. That is, for a gas that includes oxygen and is taken from an upstream side, a period of time to retain inside the air electrode collector part 70 or the air electrode 60 is comparatively long, so that it is possible to accelerate an electricity generation reaction as described above. Eventually, it is possible to improve an efficiency of an electricity generation reaction.

"A third end part 701U", that is, "a first site" refers to an area that is located on a most upstream side (a first end side) in a case where the first air electrode collector part 701 is divided into eight equal parts in a longitudinal direction thereof (a gas flow direction) by lines that extend in a width direction thereof. A second site refers to a site of a electricity generation element part A that excludes a first site. "A fourth end part 702D", that is, "a third site" refers to an area that is located on a most downstream side (a second end side) in a case where the second air electrode collector part 702 is divided into eight equal parts in a longitudinal direction thereof (a gas flow direction) by lines that extend in a width direction thereof.

It is possible to analyze "an outer surface of a third end part 701U being located in a direction that is distant from a support substrate 10 with respect to an outer surface of a fourth end part 702D" by a following method. First, three cross-sectional photographs along three lines that extend in a longitudinal direction and divide the third end part 701U into four equal parts in a width direction thereof (that include the fourth end part 702D) are obtained. For each cross-sectional photograph, a first position that is an average position on an outer surface of the third end part 701U in upward and downward directions (directions of a z-axis) and a second position that is an average position on an outer surface of the fourth end part 702U in upward and downward directions (directions of a z-axis) are calculated respectively. If a first position is located outside a second position (on a side where a gas that includes oxygen flows) in all of three cross-sectional photographs, it is found that "an outer surface of a third end part 701U is located in a direction that is distant from a support substrate 10 with respect to an outer surface of a fourth end part 702D".

As illustrated in FIG. 2, in a cross-sectional view that includes the gas flow channel 11, an electricity generation element part A, and an electrical connection part B, a curvature of a corner part of the third end part 701U (a first site) may be greater than a curvature of a corner part of the fourth end part 702D (a third site). In other words, a radius of curvature of a corner part of the third end part 701U may be less than a radius of curvature of a corner part of the fourth end part 702D.

By such a configuration, a corner part of the third end part 701U is an obstacle for a gas flow, so that it is possible to for a gas that includes oxygen to positively collide with the third end part 701U that is provided on an upstream side. Eventually, it is possible to improve an efficiency of an electricity generation reaction.

For each of three cross-sectional photographs as described above, curvatures of corner parts of the third end part 701U and the fourth end part 702D are obtained. While an average of values of three curvatures is provided as a curvature of each part, it is possible to compare both of them. It is possible to calculate a curvature of a corner part of the third end part 701U, for example, as follows. First, a first line is drawn that is a straight line that links an end of the third end part 701U on an upstream side and an end thereof on a downstream side. An outermost point on an outer surface of the third end part 701U is specified that is a position that is most distant in a direction that is orthogonal to a first line and an outward direction. In a case where an end on an upstream side, an end on a downstream side, and an outermost point are connected by a virtual curve, it is possible to provide a curvature of such a virtual curve as a curvature of a corner part of a third end part. Additionally, in a case where an outermost point is not present, a curvature is zero. It is also possible to calculate a curvature of a corner part of the fourth end part 702D by such a method similarly.

Furthermore, a porosity of the third end part 701U (a first site) of the first air electrode collector part 701 may be greater than a porosity of a site other than the third end part 701U (a second site+a third site) of the first air electrode collector part 701. Furthermore, a value of an arithmetic mean roughness of an outer surface of the third end part 701U (a first site) of the first air electrode collector part 701 may be greater than a value of an arithmetic mean roughness of a site other than the third end part 701U (a second site+a third site) of the first air electrode collector part 701. In such a case, it is found that properties of a first site, a second site, and a third site of one air collector part 701 are different.

By such configurations, it is possible to effectively take a gas that includes oxygen from the third end part 701U that is provided on an upstream side. That is, a period of time to retain inside the air electrode collector part 70 or the air electrode 60 is comparatively long, so that it is possible to improve an efficiency of an electricity generation reaction.

It is possible to calculate a value of a porosity of each site as follows. In three cross-sectional photographs as described above, the third end part 701U and a site other than the third end part 701U are specified. Then, a binarization process is executed in such a manner that it is possible to distinguish a pore part and another site other than the pore part in a captured image. Then, a proportion of a pore(s) that account(s) for a site that is a target is calculated. It is possible to provide an average of three values that are measured respectively as a value of a porosity of each site.

It is possible to calculate a value of an arithmetic mean roughness of each site as follows. In three cross-sectional photographs as described above, an arithmetic mean roughness of an outer surface of each of the third end part 701U and a site other than the third end part 701U is measured. It is possible to provide an average of three values that are measured respectively as a value of an arithmetic mean roughness of an outer surface of each site.

Furthermore, as illustrated in FIG. 2, an outer surface of an element part area (a first site+a second site) that is an area of at least one air electrode collector part 70 that is laminated on an electricity generation element part A may be located in a direction that is distant from the support substrate 10 with respect to an outer surface of an area other than the element part area (an electrical connection part B, in other words, a third site). In such a case, it is found that a shape of a third site is different from those of a first site and a second site.

Thereby, it is possible to provide a structure in such a manner that a gas that includes oxygen readily collides with an element part area of the air electrode collector part 70, so that it is possible to take, in particular, the gas that includes oxygen, in the element part area effectively. Eventually, it is possible to improve an efficiency of an electricity generation reaction.

An areas of the air electrode collector part 70 that is laminated on an electricity generation element par A refers to an area of the air electrode collector part 70 where a fuel electrode active part 22 is present in a plan view.

It is possible to analyze "an outer surface of an element part area being located in a direction that is distant from a support substrate 10 with respect to an outer surface of an area other than the element part area" by a following method. Three cross-sectional photographs as described above are obtained. For each cross-sectional photograph, a third position that is an average position of an outer surface of an element part area on any one air electrode collector part 70 in upward and downward directions (directions of a z-axis) and a fourth position that is an average position of an outer surface other than the element part area in upward and downward directions (directions of a z-axis) are calculated respectively. If a third position is located outside a fourth position (on a side where a gas that includes oxygen flows) in all of three cross-sectional photographs, it is found that "an outer surface of an element part area is located in a direction that is distant from a support substrate 10 with respect to an outer surface of an area other than the element part area".

A thickness of an area other than an element part area on the air electrode collector part 70 (in a direction of a z-axis) may be less than a thickness of the element part area. In other words, a thickness of an element part area may be greater than a thickness of an area other than the element part area.

An outermost position that protrudes outermost on an outer surface of the third end part 701U of the air electrode collector part 70 may be located in a central part thereof (a central area in a case where it is divided into three equal parts) in a width direction (a direction of a y-axis). An innermost position that is recessed innermost on an outer surface of the fourth end part 702D of the air electrode collector part 70 may be located in a central part thereof (a central area in a case where it is divided into three equal parts) in a width direction (a direction of a y-axis).

On each of upper and lower faces of the support substrate 10 with a flat plate shape, a plurality of first recesses 12 may be formed and a plurality of electricity generation element parts A may be provided, vertically asymmetrically. That is, a first electricity generation element part A1 and a second electricity generation element part A2 as described above do not have to be provided at vertically symmetric positions.

Additionally, not all air electrode collector parts 70 have to be air electrode collector parts 70 that have a characteristic as described above and only a part of the air electrode collector parts 70 may have the characteristic as described above.

(Manufacturing Method)

Figure 4:
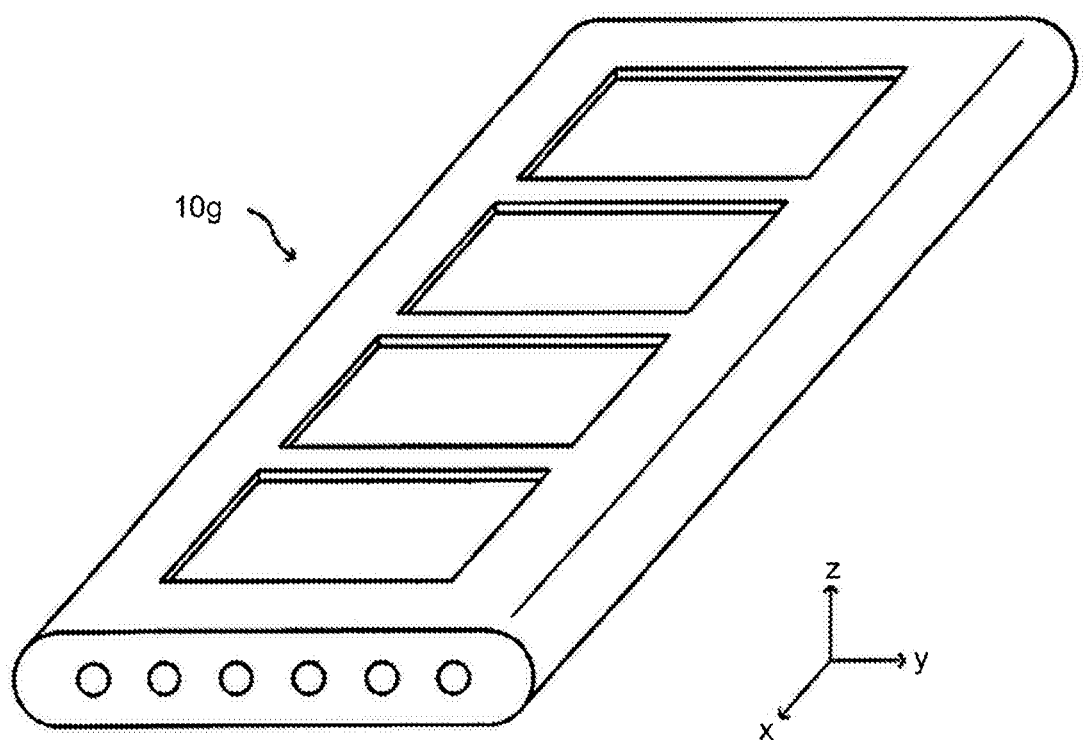
FIG. 4 is a perspective view that illustrates a support substrate in FIG. 1A.
Figure 5A:
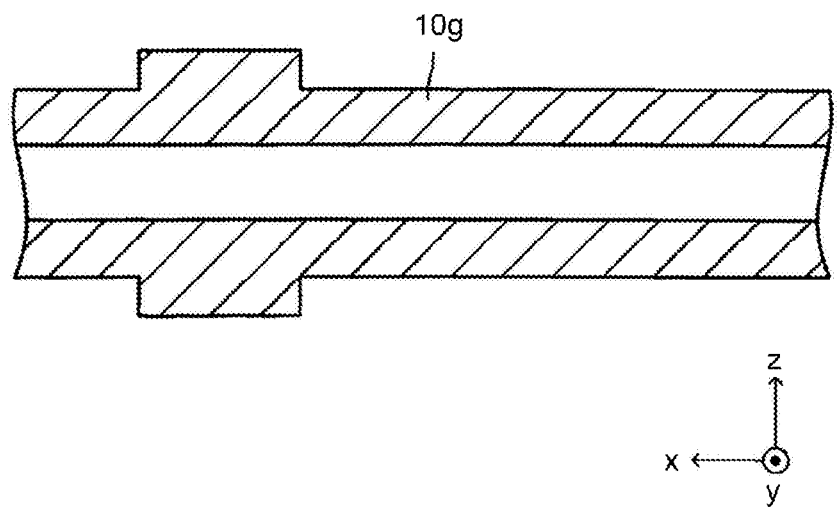
FIG. 5A is a cross-sectional view of FIG. 4.
Figure 5B:
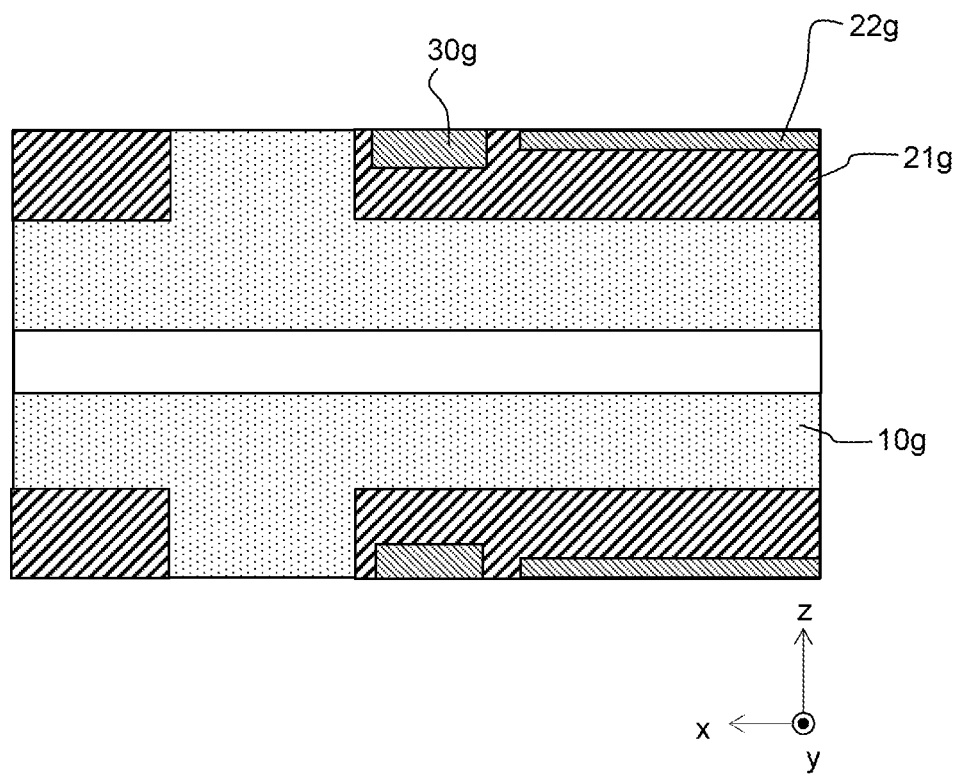
FIG. 5B is a cross-sectional view that illustrates a state where each layer is formed in a first recess.

Next, an example of a manufacturing method for a "horizontal stripe type" cell as illustrated in FIG. 1 will simply be explained with reference to FIG. 4, FIG. 5A, and FIG. 5B. In FIG. 4, FIG. 5A, and FIG. 5B, "g" at an end of a sign for each member indicates that such a member is "before firing".

First, a molded body for a support substrate 10g that has a shape as illustrated in FIG. 4 is fabricated. It is possible to fabricate such a molded body for a support substrate 10g by, for example, using a slurry that is obtained by adding a binder or the like to a powder of a material of the support substrate 10 (for example, NiO+MgO) and utilizing a technique such as extrusion molding or cutting.

Then, as illustrated in FIG. 5B, a molded body for a fuel electrode collector part 21g is arranged in each of respective first recesses that are formed on upper and lower faces of the molded body for a support substrate 10g. Then, a molded body for a fuel electrode active part 22g is arranged in each of respective second recesses that are formed on outer faces of each molded body for a fuel electrode collector part 21g. Furthermore, each molded body for a fuel electrode collector part 21g and each fuel electrode active part 22g are arranged by, for example, using a slurry that is obtained by adding a binder or the like to a powder of a material of the fuel electrode 20 (for example, Ni and YSZ) and utilizing a printing method or the like.

Subsequently, a molded body for an interconnector 30g is arranged in each of respective third recesses that are formed on "a part that excludes a part where the molded body for a fuel electrode active part 22g is buried" on outer faces of each molded body for a fuel electrode collector part 21g. Each molded body for an interconnector 30g is arranged by, for example, using a slurry that is obtained by adding a binder or the like to a powder of a material of the interconnector 30 (for example, $LaCrO_3$) and utilizing a printing method or the like.

Then, a molded film for a solid electrolyte film is provided on a whole face of an outer peripheral face of the molded body for a support substrate 10g that extends in a longitudinal direction thereof and excludes central parts of respective parts where the plurality of molded bodies for an interconnector 30g are arranged. For a molded film for a solid electrolyte film, for example, a slurry that is obtained by adding a binder or the like to a powder of a material of the solid electrolyte film 40 (for example, YSZ) is used and a printing method, a dipping method, or the like is utilized.

Then, a molded film for a reaction prevention film is provided on an outer face of a molded body for a solid electrolyte film at a location where it contacts each molded body for a fuel electrode. For each molded film for a reaction prevention film, for example, a slurry that is obtained by adding a binder or the like to a powder of a material of the reaction prevention film 50 (for example, GDC) is used and a printing method or the like is utilized.

Then, the molded body for a support substrate 10g in a state where a variety of molded films are thus provided is fired, for example, in air at 1500° C. for 3 hours. Thereby, a structural body is obtained in a state where none of the air electrode 60 and the air electrode collector part 70 is provided in a cell as illustrated in FIG. 1.

Then, a molded film for an air electrode is formed on an outer face of each reaction prevention film 50. Each molded film for an air electrode is provided by, for example, using a slurry that is obtained by adding a binder or the like to a powder of a material of the air electrode 60 (for example, LSCF) and utilizing a printing method or the like.

Then, for each set of adjacent electricity generation element parts, a molded film for an air electrode collector part is provided on outer faces of a molded film for an air electrode, the solid electrolyte film 40, and the interconnector 30 so as to bridge over the interconnector 30 that is linked to one of the electricity generation element parts A and a molded film for an air electrode of another of the electricity generation element parts A.

It is possible to provide a molded film for an air electrode collector part that is provided with a desired shape (thickness), on an outer face of a molded film for an air electrode or the like, by using a slurry that is obtained by adding a binder or the like to a powder of a material of the air electrode collector part 70 (for example, LSCF), and by a printing method or the like.

Then, the support substrate 10 in a state where molded films are thus formed is fired, for example, in air at 1050° C. for 3 hours. Thereby, a cell as illustrated in FIG. 1 is obtained.

Additionally, the present disclosure is not limited to an embodiment(s) as described above and it is possible to employ a variety of modifications within a scope of the present disclosure. For example, although a planar shape of the recess 12 that is formed on the support substrate 10 (a shape in a case where it is viewed from a direction that is perpendicular to a principal face of the support substrate 10) is a rectangular shape as illustrated in FIG. 4 or the like in an embodiment(s) as describe above, it may be, for example, a square shape, a circular shape, an elliptical shape, an elongate hole shape, or the like.

Furthermore, although a whole of the interconnector 30 is buried in each first recess 12 in an embodiment(s) as described above, only a part of the interconnector 30 may be buried in each first recess 12 and a remaining part of the interconnector 30 may protrude outside the first recess 12 (that is, protrude from a principal face of the support substrate 10).

Furthermore, although the plurality of first recesses 12 are formed and the plurality of electricity generation element parts A are provided, on each of upper and lower faces of the support substrate 10 with a flat plate shape in an embodiment(s) as described above, the plurality of first recesses 12 may be formed and the plurality of electricity generation element parts A may be provided, on only one face of the support substrate 10.

Furthermore, although the fuel electrode 20 is composed of two layers that are the fuel electrode collector part 21 and the fuel electrode active part 22 in an embodiment(s) as described above, the fuel electrode 20 may be composed of one layer that corresponds to the fuel electrode active part 22.

It is possible for a person skilled in the art to readily derive additional effects and/or variations. Hence, broader aspects of the present invention are not limited to specific details and representative embodiments as illustrated and described above. Therefore, various modifications are possible without departing from the spirit or scope of a general inventive concept that is defined by the appended claims and equivalents thereof.

REFERENCE SIGNS LIST

A . . . electricity generation element part
B . . . electrical connection part
10 . . . support substrate
11 . . . gas flow channel
20 . . . fuel electrode
40 . . . solid electrolyte
60 . . . air electrode
70 . . . air electrode collector part
701 . . . first air electrode collector part
701U . . . third end part
702 . . . second air electrode collector part
702D . . . fourth end part

The invention claimed is:

1. A cell comprising:
a substrate including a surface, and a gas flow channel therein;
a first element on the surface, including:
a first electrode on the surface; and
a second electrode on the first electrode with a first electrolyte therebetween;
a second element next to the first element on the surface with a connector therebetween, including:
a third electrode on the surface; and
a fourth electrode on the third electrode with a second electrolyte therebetween, electrically connected to the first electrode; and
the second element further including a first electrode collector on the fourth electrode and a part of the connector, and the first electrode collector having a first value of an arithmetic mean roughness of a part of an outer surface on the fourth electrode that is greater than a value of an arithmetic mean roughness of an outer surface on the part of the connector.

2. The cell according to claim 1, wherein
the first electrode collector includes:
a first end part closest to the first element, including an outer surface that has the first value;
a second end part on the fourth electrode farthest to the first element; and
an outer surface at the second end part, the outer surface having a second value of an arithmetic mean roughness that is greater than the first value.

3. The cell according to claim 1, wherein the first electrode collector has a first height on a part of the connector with respect to the surface, and a second height on the fourth electrode with respect to the surface, the second height being greater than the first height.

4. The cell according to claim 1, wherein
the first element further includes a second electrode collector on the second electrode, and having a first height with respect to the surface; and
wherein the first electrode collector is not in contact with the second electrode collector, and has a second height on the part of the connector with respect to the surface, the second height being less than the first height.

5. The cell according to claim 4, wherein
the second electrode collector includes a first end part closest to the second element, wherein the first end part has a third height with respect to the surface, and
the first electrode collector includes a second end part closest to the first element, wherein the second end part has a fourth height with respect to the surface, and the fourth height is less than the third height.

6. The cell according to claim 4, wherein
the second electrode collector includes a first corner part closest to the second element,
the first electrode collector includes a second corner part closest to the first element, and
a curvature of the first corner part is greater than a curvature of the second corner part when viewed from a cross section that includes the gas flow channel, the first element, the second element, and the connector.

7. The cell according to claim 1, wherein
the first electrode collector includes:
    a first portion on the connector; and
    a second portion on the fourth electrode,
the first portion has a first porosity, and
the second portion has a second porosity greater than the first porosity.

8. The cell according to claim 7, wherein
the first electrode collector includes:
    a first end part closest to the first element, and
    a second end part on the fourth electrode farthest to the first element, and having a porosity that is greater than a porosity of the first end part.

9. The cell according to claim 7, wherein
the first electrode collector has a first height on the part of the connector with respect to the surface, and a second height on the fourth electrode with respect to the surface, the second height being greater than the first height.

\* \* \* \* \*